United States Patent
Widahl et al.

(10) Patent No.: US 9,024,807 B2
(45) Date of Patent: May 5, 2015

(54) VERIFICATION OF A LEVEL GAUGE SYSTEM

(71) Applicant: Rosemount Tank Radar AB, Gothenburg (SE)

(72) Inventors: Christoffer Widahl, Vastra Frolunda (SE); Michael Larsson, Gothenburg (SE)

(73) Assignee: Rosemount Tank Radar AB, Gothenburg (SE)

( * ) Notice: Subject to any disclaimer, the term of this patent is extended or adjusted under 35 U.S.C. 154(b) by 300 days.

(21) Appl. No.: 13/628,297

(22) Filed: Sep. 27, 2012

(65) Prior Publication Data

US 2014/0085131 A1  Mar. 27, 2014

(51) Int. Cl.
*G01S 13/08* (2006.01)
*G01F 25/00* (2006.01)
*G01S 13/88* (2006.01)

(52) U.S. Cl.
CPC ............. *G01F 25/0061* (2013.01); *G01S 13/88* (2013.01)

(58) Field of Classification Search
CPC .... G01F 23/284; G01F 25/0061; G01S 13/88
USPC ........................................................ 342/124
See application file for complete search history.

(56) References Cited

U.S. PATENT DOCUMENTS

| 6,828,930 | B2* | 12/2004 | Hagg | 342/124 |
|---|---|---|---|---|
| 2005/0264440 | A1* | 12/2005 | Smith | 342/124 |
| 2008/0036649 | A1* | 2/2008 | Lyon | 342/174 |
| 2010/0207807 | A1* | 8/2010 | Kuhlow et al. | 342/124 |
| 2012/0056774 | A1* | 3/2012 | Wennerberg et al. | 342/124 |
| 2013/0199262 | A1* | 8/2013 | Nielson et al. | 73/1.31 |

OTHER PUBLICATIONS

Notification of Transmittal of the International Search Report and the Written Opinion of the International Searching Authority, or the Declaration dated Feb. 21, 2014 in related International Application No. PCT/SE2013/000136, filed Sep. 5, 2013. 10 pgs.
Operating Instructions, Levelflex M FMP43, Guided Level Radar, Calibration Kit, *Endress+Hauser*, pp. 1-16. Aug. 2007.

* cited by examiner

*Primary Examiner* — John B Sotomayor
*Assistant Examiner* — Marcus Windrich
(74) *Attorney, Agent, or Firm* — Westman, Champlin & Koehler, P.A.

(57) ABSTRACT

The present invention relates to a method of verifying a measurement accuracy of a level gauge system. The method comprises determining a first measurement value indicative of a time-of-flight of a first electromagnetic reflection signal to a reference reflector and back; determining a measurement unit verification measurement value based on a response signal from a verification arrangement; determining a second measurement value indicative of a time-of-flight of a second electromagnetic reflection signal to the reference reflector and back; and determining a verification result based on the first measurement value, the second measurement value and the measurement unit verification measurement value. Through embodiments of the present invention, it will be verified that the measurement unit is functioning correctly and that level gauge system works as it should also after being reconnected to the propagation device.

10 Claims, 5 Drawing Sheets

VERIFICATION OF A LEVEL GAUGE SYSTEM

FIELD OF THE INVENTION

The present invention relates to a method of verifying a measurement accuracy of a level gauge system, and to a level gauge system.

TECHNICAL BACKGROUND

Radar level gauge (RLG) systems are in wide use for determining the filling level of a product contained in a tank. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged to extend vertically from the top towards the bottom of the tank. The probe may also be arranged in a measurement tube, a so-called chamber, that is connected to the outer wall of the tank and is in fluid connection with the inside of the tank.

The transmitted electromagnetic signals are reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and reception of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity of the electromagnetic signals.

Most radar level gauge systems on the market today are either so-called pulsed radar level gauge systems that determine the distance to the surface of the product contained in the tank based on the difference in time between transmission of a pulse and reception of its reflection at the surface of the product, or systems that determine the distance to the surface based on the frequency difference between a transmitted frequency-modulated signal and its reflection at the surface. The latter type of systems are generally referred to as being of the FMCW (Frequency Modulated Continuous Wave) type.

In several applications, the filling level determined using a radar level gauge system is used to determine an amount of funds to be transferred from one party to another. An example of such an application is in the so-called upstream petroleum industry, where GWR systems are often used to determine the filling level in production tanks. This filling level may in turn be used to determine payments to subsurface rights owners.

In this and other applications, it is thus important that the accuracy of the filling level determination is trusted by all parties. Verification of the measurement accuracy of the GWR systems is therefore regularly carried out.

Currently, such verification is performed by pumping the product up and down in the tank and verifying measurement results obtained using the GWR system with manual measurements, such as by dipping.

This type of verification measurement is, however time-consuming and cumbersome. Verification of one level gauge system using this method may require two operators and at least one tank truck during one day.

SUMMARY

In view of the above, a general object of the present invention is to provide for an improved and more efficient way of verifying the measurement accuracy of a level gauge system.

According to a first aspect of the present invention, it is therefore provided a method of verifying a measurement accuracy of a level gauge system comprising a measurement unit and a propagation device attached to a tank for propagating electromagnetic signals generated by the measurement unit towards a product in the tank, wherein the method comprises the steps of: feeding, to the propagation device, a first electromagnetic transmit signal generated by the measurement unit; receiving, at the measurement unit, a first electromagnetic reflection signal being a reflection of the first electromagnetic transmit signal at a reference reflector arranged in the tank; determining a first measurement value indicative of a time-of-flight of the first electromagnetic reflection signal from the measurement unit to the reference reflector and back to the measurement unit; feeding, to a verification arrangement having at least one known electromagnetic signal propagation property, an electromagnetic signal generated by the measurement unit; receiving, at the measurement unit, a response signal from the verification arrangement, the response signal being indicative of the at least one electromagnetic signal propagation property of the verification arrangement; determining a measurement unit verification measurement value based on the response signal; feeding, to the propagation device, a second electromagnetic transmit signal generated by the measurement unit; receiving, at the measurement unit, a second electromagnetic reflection signal being a reflection of the second electromagnetic transmit signal at the reference reflector arranged in the tank; determining a second measurement value indicative of a time-of-flight of the second electromagnetic reflection signal from the measurement unit to the reference reflector and back to the measurement unit; and determining a verification result based on the first measurement value, the second measurement value and the measurement unit verification measurement value.

An example of a measurement value indicative of the time-of-flight of an electromagnetic signal reflected at the reference reflector may be the distance from the measurement unit to the reference reflector.

By "electromagnetic signal propagation property" should be understood any property of the propagation of an electromagnetic signal, such as one or several of delay, attenuation, phase shift, frequency shift, polarization shift etc.

The present invention is based on the realization that a verification of the measurement accuracy of a level gauge system, including the installation at the tank, can be achieved by verifying the operation of the measurement unit using a verification arrangement, and additionally verifying that a reference measurement performed with the level gauge system installed at the tank is substantially the same before and after the operation of the measurement unit is verified using the verification arrangement.

Especially in cases when the measurement unit is disconnected from the propagation device before verifying the operation of the measurement unit using the verification arrangement, there is a risk that the measurement unit is not properly reconnected to the propagation device. Through embodiments of the present invention, it will be verified that the measurement unit is functioning correctly and that level gauge system works as it should also after being reconnected to the propagation device. This will provide for simpler and less time-consuming verification of the measurement accuracy, as well as for an increased trust in the verification.

According to various embodiments of the present invention, the verification arrangement may comprise a connector; and the method may further comprise the steps of: disconnecting the measurement unit from the propagation device after having determined the first measurement value; connecting the measurement unit to the connector of the verification arrangement; and disconnecting the measurement unit from the connector of the verification arrangement and reconnecting the measurement unit to the propagation device after having determined the measurement unit verification measurement value.

In these and other embodiments, the verification arrangement may, for example, be provided in the form of a portable unit that can easily be taken to a site where a level gauge system to be verified is installed. Following a first measurement of the distance to the reference reflector, the measurement unit may be disconnected from the propagation device without breaking the process seal, in the case of a closed tank. Thereafter, the measurement unit is connected to the verification arrangement and a verification measurement for the measurement unit is carried out. After having performed the verification measurement using the verification arrangement, the measurement unit is reconnected to the propagation device and a new measurement of the distance to the reference reflector is carried out.

The verification arrangement may advantageously comprise a verification waveguide electrically connected to the connector, the verification waveguide providing a known delay between an electromagnetic signal fed to the verification waveguide and a reflected electromagnetic signal returned by the verification waveguide.

In some embodiments, the verification arrangement may comprise several verification waveguides providing different delays and a switch for allowing a user of the verification arrangement to switch between the verification waveguides. The delay provided by a particular waveguide may be dependent on the length of the waveguide.

To further improve the verification of the measurement accuracy of the level gauge system, various embodiments of the method according to the present invention may further comprise the steps of: recording a first value of an internal temperature of the measurement unit in connection with the step of determining the first measurement value; and recording a second value of the internal temperature of the measurement unit in connection with the step of determining the second measurement value.

In such embodiments, the verification result may further be based on the first value of the internal temperature of the measurement unit and the second value of the internal temperature of the measurement unit.

According to various embodiments, the level gauge system may be a guided wave radar level gauge system, the propagation device may be a transmission line probe, and the reference reflector may be arranged along the transmission line probe.

In other embodiments, the propagation device may be a radiating antenna, and the reference reflector may be a reflecting structure arranged somewhere in the tank. Such a reflecting structure may either be fixed or be controllable between a first position outside the antenna lobe and a second position inside the antenna lobe.

To allow for verification measurements to take place at practically any time during operation of the tank where the level gauge system is installed, the reference reflector may advantageously be arranged at such a level in the tank that the reference reflector remains unsubmerged in the product during normal operation of the tank. This allows for verification measurements to take place practically regardless of filling level and electrical properties of the product in the tank.

Various embodiments of the method according to the present invention may further be provided as a computer program. In particular, it is provided non-volatile computer readable medium comprising code adapted to control a level gauge system to carry out the method according various embodiments of the present invention.

According to a second aspect of the present invention, there is provided a level gauge system, for determining a filling level of a product in a tank, the level gauge system comprising: a transceiver configured to generate, transmit and receive electromagnetic signals; a propagation device arranged to propagate an electromagnetic transmit signal from the transceiver towards the product and to return to the transceiver an electromagnetic reflection signal resulting from reflection of the electromagnetic transmit signal at a surface of the product; and processing circuitry connected to the transceiver for determining the filling level based on the electromagnetic reflection signal, wherein the level gauge system further comprises: a connector for allowing connection of the transceiver to a verification arrangement having at least one known electromagnetic signal propagation property; and switching circuitry controllable to electrically disconnect the propagation device from the transceiver and electrically connect the connector to the transceiver.

It may be desirable to allow for verification of a level gauge system to take place without having to detach the measurement unit from the tank. According to the second aspect of the present invention, this is achieved by providing a connector and switching circuitry for providing controllable access to the transceiver without having to detach the measurement unit from the tank.

To that end, the connector may advantageously be accessible from the outside of the measurement unit. For instance, the connector may be protected by a removable cover.

In order to verify operation of the measurement unit, the verification arrangement may be moved to the location of the measurement unit, usually the roof of the tank. Alternatively, a cable may be provided to route signals from the connector to a location closer to the ground. Such a cable may advantageously be thermally insulated and/or provided with a temperature control device to control the temperature of the cable through heating and/or cooling of the cable.

According to various embodiments, the switching circuitry may be configured to electrically disconnect the propagation device from the transceiver and electrically connect the connector to the transceiver in response to a control signal. Such a control signal may come directly from an external control device, such as a computer that may be temporarily connected to a data interface of the measurement unit.

Alternatively, the control signal may be provided by the processing circuitry comprised in the level gauge system. In the latter case, the processing circuitry may be controllable between: a filling level determination mode in which the processing circuitry controls the switching circuitry to electrically connect the transceiver to the propagation device; and a verification mode in which the processing circuitry controls the switching circuitry to electrically connect the transceiver to the connector.

According to various embodiments, furthermore, the verification arrangement may be comprised in the level gauge system. In these embodiments, verification of the measurement accuracy could be carried out remotely, which will further reduce the operational cost of the level gauge system. Depending on how frequently verification needs to be carried out for a particular level gauge system, the higher cost of a level gauge system including a verification arrangement may be justified by the savings in operational cost of the level gauge system.

Further embodiments of, and effects obtained through this second aspect of the present invention are largely analogous to those described above for the first aspect of the invention.

According to a third aspect of the present invention, there is provided a level gauge system, for determining a filling level of a product in a tank, the level gauge system comprising: a transceiver configured to generate, transmit and receive electromagnetic signals; a propagation device arranged to propagate an electromagnetic transmit signal from the transceiver towards the product and to return to the transceiver an electromagnetic reflection signal resulting from reflection of the electromagnetic transmit signal at a surface of the product; and a reference reflector arranged in the tank for providing an electromagnetic reference signal resulting from reflection of the electromagnetic transmit signal at the reference reflector; a memory; and processing circuitry connected to the transceiver and the memory, the processing circuitry being controllable between: a filling level determination mode, in which the processing circuitry determines the filling level based on the electromagnetic reflection signal; and a verification mode, in which the processing circuitry: determines if the memory contains an indication that verification measurement using a verification arrangement has been carried out; and if the memory contains the indication: determines a measurement value indicative of a distance to the reference reflector based on the electromagnetic reference signal; stores the measurement value in the memory; compares the measurement value with a previous measurement value determined prior to the verification measurement; and provides a verification result based on the comparison.

Various embodiments of the level gauge system according to the third aspect of the present invention ensure that a second measurement of the distance to the reference reflector is only carried out if a verification measurement using the verification arrangement has been carried out. This prevents abuse of the verification by, for example, skipping a measurement or using an old measurement result. Hereby, trust in the verification can be increased, which reduces the risk that any party would require the use of hand dipping or other labor intensive and time consuming verification measurements.

To handle possible differences in measurements caused by temperature variations, the level gauge system may advantageously further comprise a temperature sensor for providing a temperature signal indicative of a temperature of at least a portion of the level gauge system, and the processing circuitry may be connected to the temperature sensor and, in the verification mode, the processing circuitry may acquire the temperature signal from the temperature sensor and stores a value indicative of the temperature.

By storing various information in the memory, such as an indication of the verification result, an ID of the verification arrangement, dates, times and temperatures etc, it will be possible to provide a detailed certificate of the verification, which will further promote trust in the verification and provide traceability.

Further embodiments of, and effects obtained through this third aspect of the present invention are largely analogous to those described above for the first and second aspects of the invention.

In summary, the present invention thus relates to a method of verifying a measurement accuracy of a level gauge system. The method comprises determining a first measurement value indicative of a time-of-flight of a first electromagnetic reflection signal to a reference reflector and back; determining a measurement unit verification measurement value based on a response signal from a verification arrangement; determining a second measurement value indicative of a time-of-flight of a second electromagnetic reflection signal to the reference reflector and back; and determining a verification result based on the first measurement value, the second measurement value and the measurement unit verification measurement value. Through embodiments of the present invention, it will be verified that the measurement unit is functioning correctly and that level gauge system works as it should also after being reconnected to the propagation device.

BRIEF DESCRIPTION OF THE DRAWINGS

These and other aspects of the present invention will now be described in more detail, with reference to the appended drawings showing an exemplary embodiment of the invention, wherein:

FIG. 3b is a schematic block diagram of the measurement unit comprised in the level gauge system in FIG. 3a;

DETAILED DESCRIPTION OF EXAMPLE EMBODIMENTS

In the present detailed description, various embodiments of the verification method according to the present invention are mainly discussed with reference to verification of the measurement accuracy of a pulsed radar level gauge system of the GWR (guided wave radar) type.

It should be noted that this by no means limits the scope of the present invention, which also covers verification procedures for verification of the measurement accuracy of other types of level gauge systems, such as level gauge systems that are not pulsed, but emit a substantially continuous signal, such as so-called FMCW (frequency modulated continuous wave) systems. Furthermore, the verification method according to various embodiments of the present invention may equally well be used for verification of the measurement accuracy of free radiating radar level gauge systems.

An example of a level gauge system that can be verified using various embodiments of the verification method according to the present invention will now be described with reference to FIG. 1a.

Figure 1A:
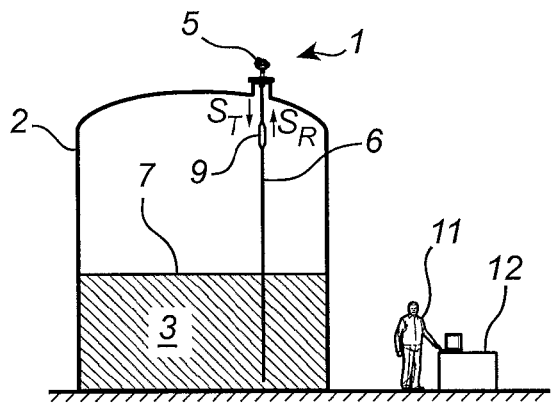
FIGS. 1a-c schematically different phases of verification using a first embodiment of the method according to the present invention.

FIG. 1a schematically illustrates a level gauge system 1 arranged on top of a tank 2 for determining the filling level of a product 3 in the tank 2 using microwaves. The level gauge system 1 is therefore in the following referred to as a radar level gauge system or an RLG-system.

The radar level gauge system 1 comprises a measurement unit 5, a propagation device, here in the form of a transmission line probe 6 for propagating microwaves towards a surface 7 of the product 3 contained in the tank 2.

When measuring the filling level of the product 3 contained in the tank 2, the radar level gauge system 1 transmits an electromagnetic transmission signal $S_T$ by the transmission line probe 6 towards the surface 7 of the product 3, where the signal is reflected as a surface echo signal $S_R$. The distance between a reference position at the top of the tank 2 and the surface 7 of the product 3 is then determined based on the difference in time-of-flight of the surface echo signal $S_R$ (from the radar level gauge system 1 to the surface 7 and back) and an echo signal reflected from the reference position at the top of the tank. From the distance (time) between the surface echo and the reference echo, and known dimensions of the tank 2, the filling level can be deduced.

There is also a reference reflector arranged in the tank 2. In the exemplary level gauge system 1 in FIG. 1a, the reference reflector is provided in the form of a conductive substantially cylindrical structure 9 attached to the transmission line probe 6. This reference reflector 9 is arranged at a fixed position along the transmission line probe, and the electromagnetic transmission signal $S_T$ will be partly reflected by the reference reflector 9 to provide an electromagnetic reflection signal which is returned by the transmission line probe to the measurement unit 5.

It should be noted that, although a tank 2 containing a single product 3 is discussed herein, the distance to any material interface present in the tank 2 can be measured in a similar manner given that the electromagnetic signals transmitted by the measurement unit are not attenuated so much that no useful reflection signal can be obtained.

For level gauge systems 1 such as that described above with reference to FIG. 1, it may be desirable to test and/or verify the measurement accuracy from time to time. As is schematically indicated in FIG. 1a, verification of the measurement accuracy will be carried out be an operator 11 provided with a verification arrangement, here in the form of a verification station 12.

Figure 1B:
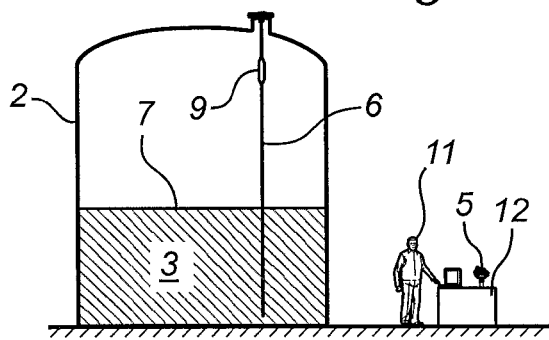
Figure 1C:
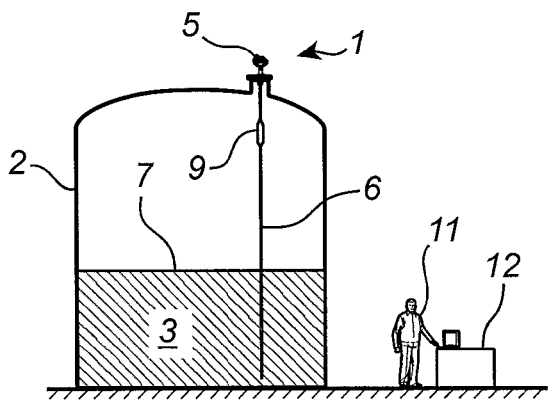

FIGS. 1b-c illustrate later phases of a first embodiment of the verification method according to the present invention, and will be described in further detail below.

Figure 2:
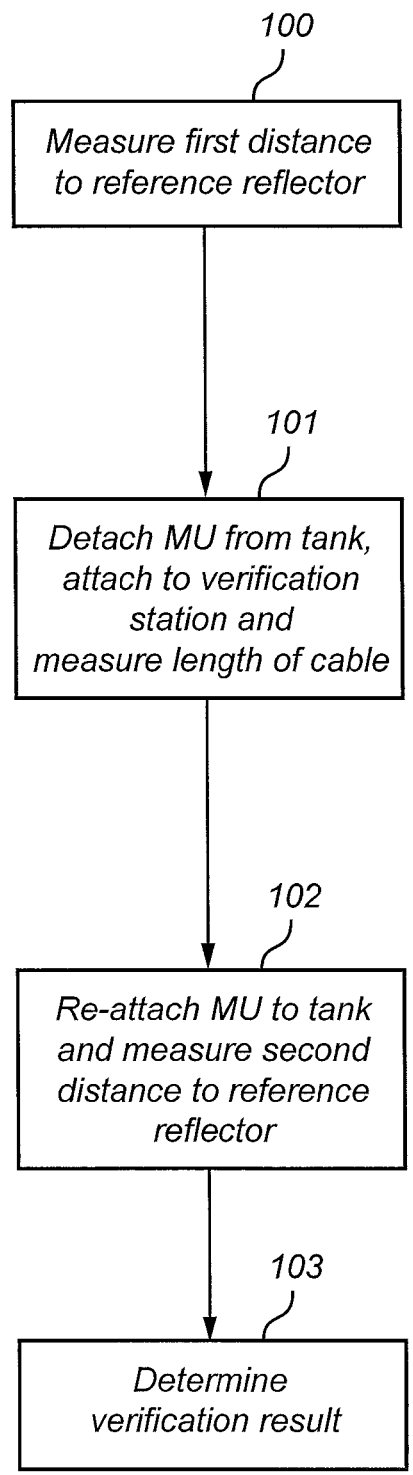
FIG. 2 is a flow-chart outlining the method according to the first embodiment of the present invention.

A first embodiment of the verification method according to the present invention will now be described with reference to FIGS. 1a-c and the flow-chart in FIG. 2.

In the first step 100, a first distance $d_{RR1}$ to the reference reflector 9 is measured. This step is carried out with the measurement unit 5 attached to the tank 2 and connected to the transmission line probe 6 as shown in FIG. 1a.

In the subsequent step 101, the operator 11 detaches the measurement unit 5 from the tank 2, and attaches the measurement unit 5 to the verification station 12. This is schematically illustrated in FIG. 1b. When the measurement unit 5 is attached to the verification station 12, the operator 11 controls the measurement unit 5 to measure an electromagnetic signal propagation property of the verification station 12. This electromagnetic signal propagation property may, for example, be the length of a coaxial cable comprised in the verification station 12.

After having determined the length of the coaxial cable using the measurement unit 5, the measurement unit 5 is re-attached to the tank 2 in step 102. This is shown in FIG. 1c.

When the measurement unit 5 has been re-attached to the tank 2, a second distance $d_{RR2}$ to the reference reflector 9 is measured.

Finally, in step 103, a verification result is determined based on the first distance $d_{RR1}$ to the reference reflector 9 measured in step 100, the second distance $d_{RR2}$ to the reference reflector 9 measured in step 102, and the length of the coaxial cable of the verification station 12 measured in step 101.

An example of a level gauge system 1 that can be verified using various embodiments of the method according to the present invention will now be described in more detail with reference to FIGS. 3a-b.

As can be seen in FIG. 1, the level gauge system 1, here a GWR-system, comprises a measurement unit 5 arranged outside the tank 2, and a transmission line probe 6 arranged inside the tank 2. The transmission line probe 6 is attached to the tank 2 at a coupling 20 schematically shown in FIG. 3a. The coupling 20, which may also be referred to as process seal, performs the dual function of mechanically attaching the transmission line probe 6 to the tank 2 and providing an electrical feed-through to allow electrical connection to the transmission line probe 6 from the outside of the tank 2.

Figure 3A:
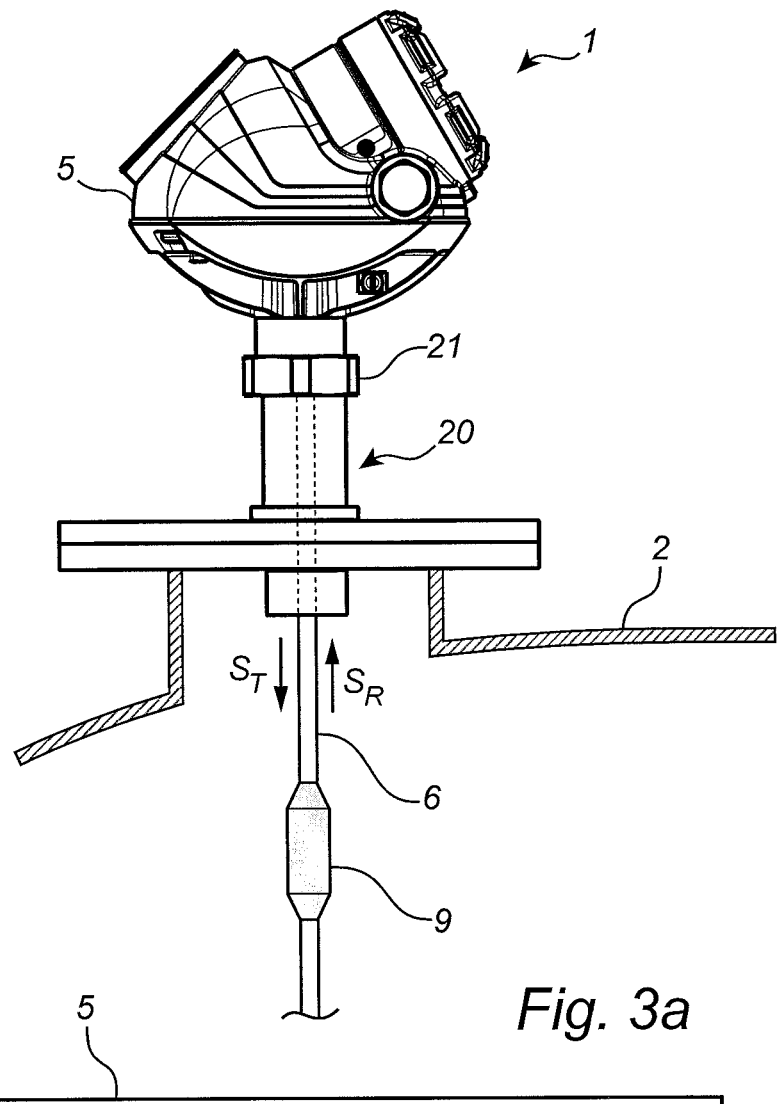
FIG. 3a schematically shows an example of a level gauge system that can be verified using the method of FIG. 1.

As is also schematically indicated in FIG. 3a, the measurement unit 5 is attached to the coupling 20 through nut 21. When attached to the coupling 20, the measurement unit 5 is electrically connected to the transmission line probe, so that an electromagnetic transmission signal $S_T$ generated by the measurement unit 5 can propagate along the transmission line probe 6, and an electromagnetic reflection signal $S_R$, being a reflection of the electromagnetic transmission signal at the reference reflector 9 can propagate along the transmission line probe 6 back towards the measurement unit 5.

The measurement unit 5 can be detached from the coupling 20 and thus from the tank 2 without breaking the process seal by turning the nut 21 to release the measurement unit 5 from the coupling 20.

Figure 3B:
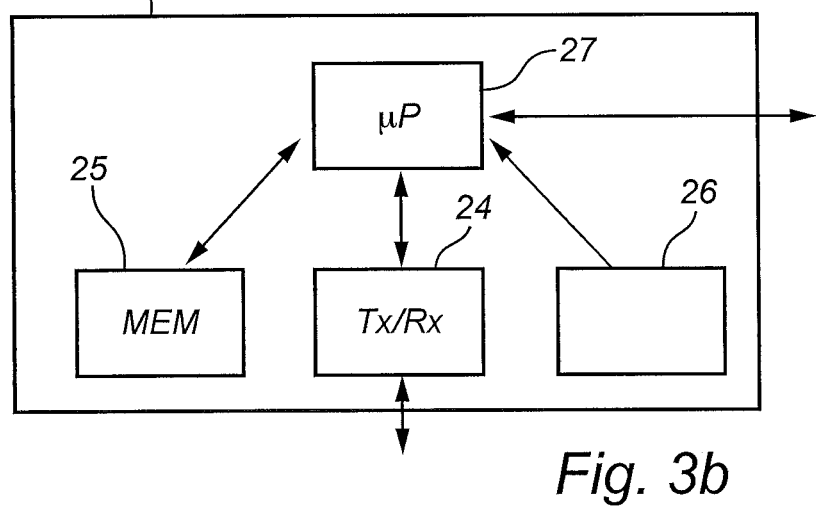

Referring now to FIG. 3b, which is a schematic block diagram of the measurement unit 5 comprised in the GWR-system 1 in FIG. 3a, the measurement unit 5 comprises a transceiver 24, a memory 25, a temperature sensor 26 and processing circuitry, here shown as a processing unit 27. As is indicated by arrows in FIG. 3b, the transceiver 24 is connected to the processing unit 27 and the transceiver 24 is also connected to the transmission line probe 6 when the measurement unit 5 is attached to the coupling 20 as shown in FIG. 3a. The memory 25 and the temperature sensor 26 are both connected to the processing unit 27, and the processing unit 27 is connectable to an external device, such as a control center and/or the computer of an operator (not shown in FIG. 3b).

Figure 4A:
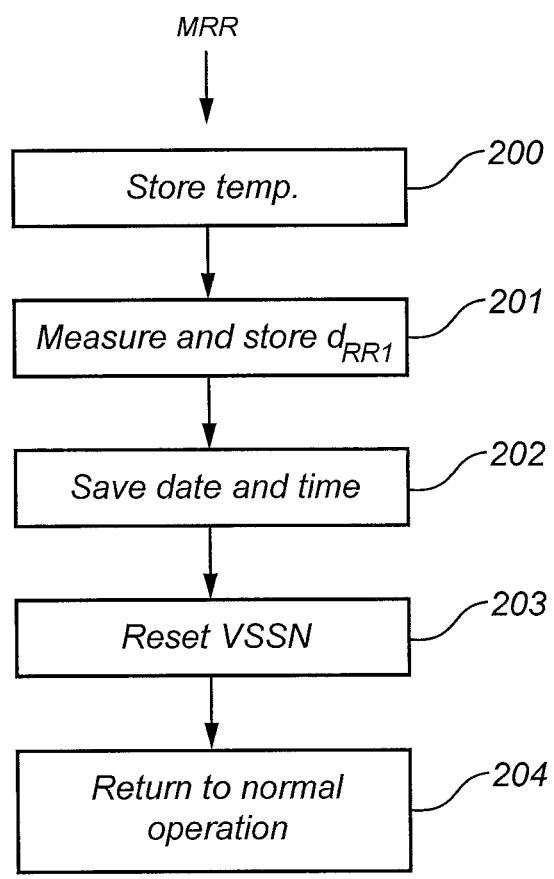
FIG. 4a is a flow-chart outlining a first part of a verification method according to a second embodiment of the present invention.

With reference to FIGS. 4a-b and FIGS. 3a-b, different parts of a verification method according to a second embodiment of the present invention will now be described. FIG. 4a is a flow-chart outlining a first part of the method, to be carried out before the measurement unit verification measurement carried out using a verification arrangement as described above in connection with FIGS. 1a-c and FIG. 2, and FIG. 4b is a flow-chart outlining a second part of the verification method, to be carried out after the measurement unit verification measurement.

Referring to FIG. 4a and FIGS. 3a-b, the first process is initiated by providing the command MRR (Measure Reference Reflector) to the processing unit 27 of the level gauge system 1. In a first step 200, the internal temperature of the measurement unit 5 is measured using the temperature sensor 26 and stored in the memory 25. Subsequently, in step 201, a first distance $d_{RR1}$ to the reference reflector 9 is measured and stored in the memory 25. Thereafter, the date and time are stored in the memory 25 in step 202.

In the next step 203, the register in the memory 25 holding the verification station serial number (VSSN) is reset. The VSSN indicates that a measurement unit verification measurement has been carried out and identifies the verification station that was used to carry out the measurement unit verification measurement.

Finally, in step 204, the GWR-system 1 returns to normal operation.

After carrying out the first process described above, the operator 11 may, as is indicated in FIG. 1b, detach the measurement unit 5 from the tank, attach the measurement unit 5 to a verification station 12, perform a measurement unit verification measurement, detach the measurement unit from the verification station 12 and re-attach the measurement unit 5 to the tank 2. In the process of carrying out the measurement unit verification measurement, the VSSN identifying the verification station 12 will be stored in a dedicated register of the memory 25 comprised in the measurement unit.

Figure 4B:
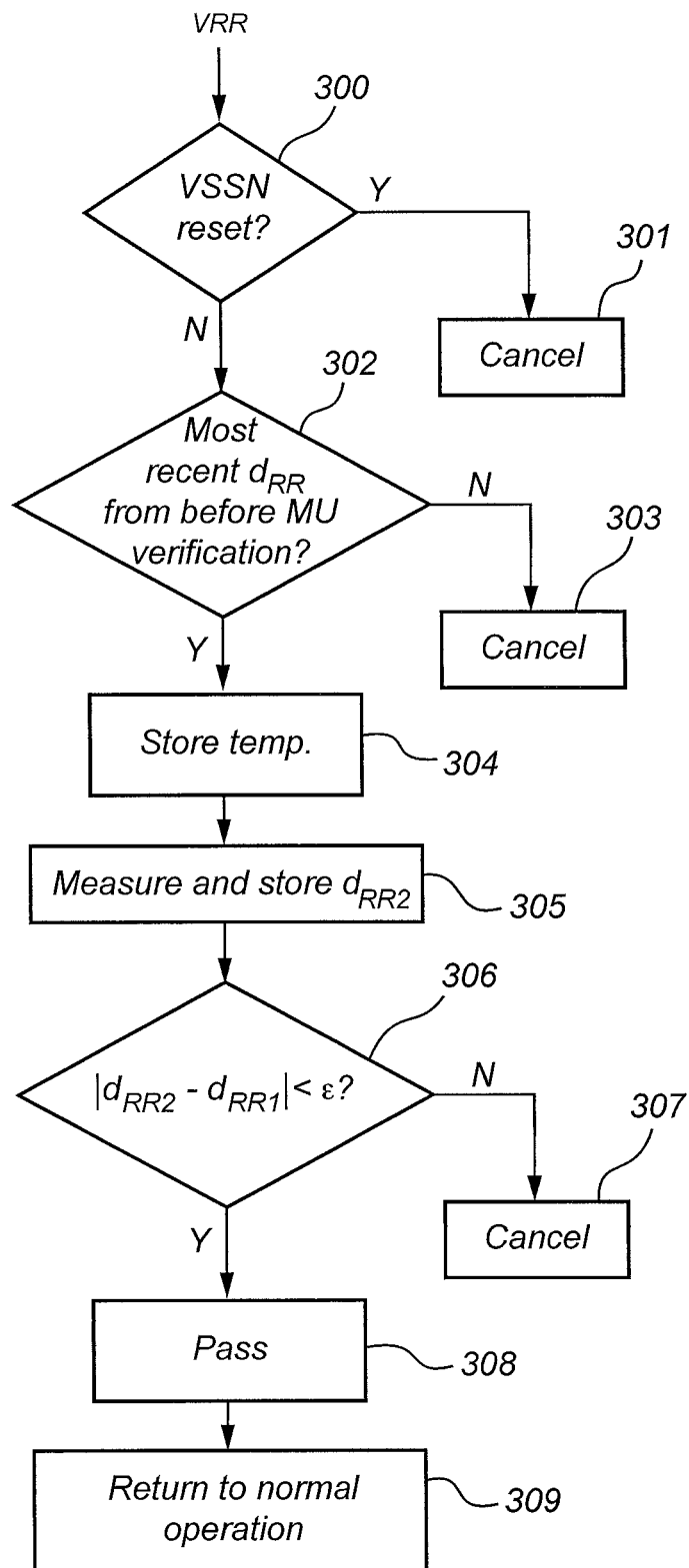
FIG. 4b is a flow-chart outlining a second part of the verification method according to the second embodiment of the present invention.

Referring to FIG. 4b and FIGS. 3a-b, the second process is initiated by providing the command VRR (Verify Reference Reflector) to the processing unit 27 of the level gauge system 1. In a first step 300, the processing unit 27 checks if the register in the memory 25 holding the VSSN has been reset. If that is the case, it is concluded that no measurement unit verification measurement has been carried out, and the process is cancelled in step 301. If VSSN is not reset, this indicates that a measurement unit verification measurement has been carried out, and the process proceeds to step 302 to check if the date and time of the previous verification process (carried out in response to the command VRR) was before the date and time of the previous measurement process (carried out in response to the command MRR), or that there is no date and time stored for a previous verification process. If it is determined that the most recent date and time (and thus the most recent distance to the reference reflector 9) does not come from a measurement carried out before a measurement unit verification measurement, then the process is cancelled in step 303. Otherwise the process proceeds to measure the internal temperature of the measurement unit 5 using the temperature sensor 26 and store the temperature in the memory 25 in step 304.

Subsequently, in step 305, the distance $d_{RR2}$ to the reference reflector 9 is measured and stored in memory 25.

In the next step 306, it is determined if the absolute difference between the first distance $d_{RR1}$ to the reference reflector 9 measured before the measurement unit verification measurement and the second distance $d_{RR2}$ to the reference reflector 9 measured after the measurement unit verification measurement is smaller than a predefined value a which may depend on the requirements on measurement accuracy of the particular application. In one exemplary application, the predefined value may be 3 millimeters. The predefined value and/or one or both of the first $d_{RR1}$ and second $d_{RR2}$ distances to the reference reflector 9 may be adjusted based on the measured internal temperature.

If the absolute difference is greater than the predefined value c, then the process is canceled in step 307. Otherwise, the process proceeds to step 308 and passes the verification. Finally, the level gauge system 1 is returned to normal operation in step 309.

So far, a verification method has been described that involves detaching the measurement unit 5 from the tank before attaching the measurement unit 5 to a connector of a verification station 12. Depending on application, it may, however be desirable to provide for verification of the measurement accuracy without detaching the measurement unit 5 from the tank 1.

Figure 5A:
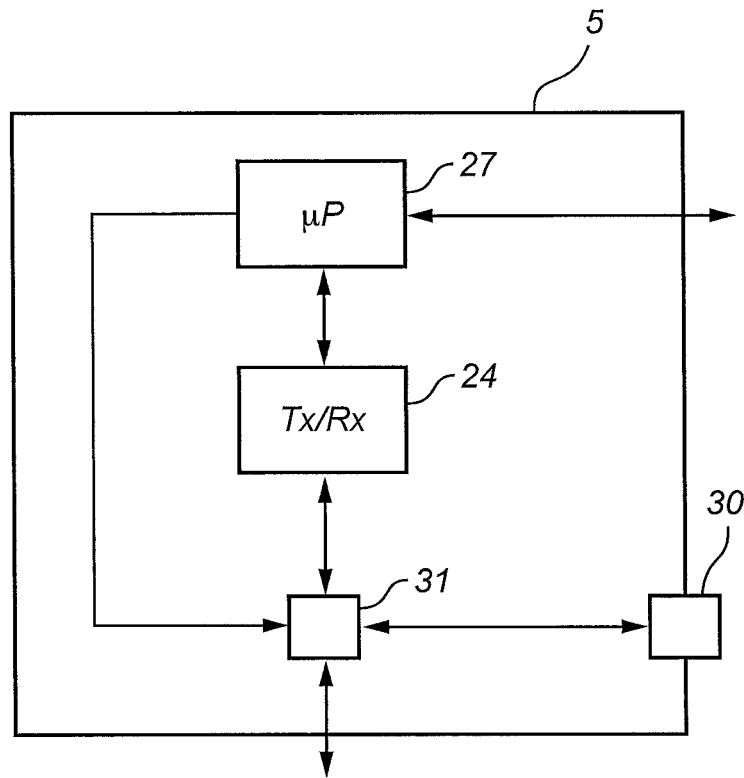
FIGS. 5a-b are schematic block diagrams of further example embodiments of the level gauge system according to the present invention.
Figure 5B:
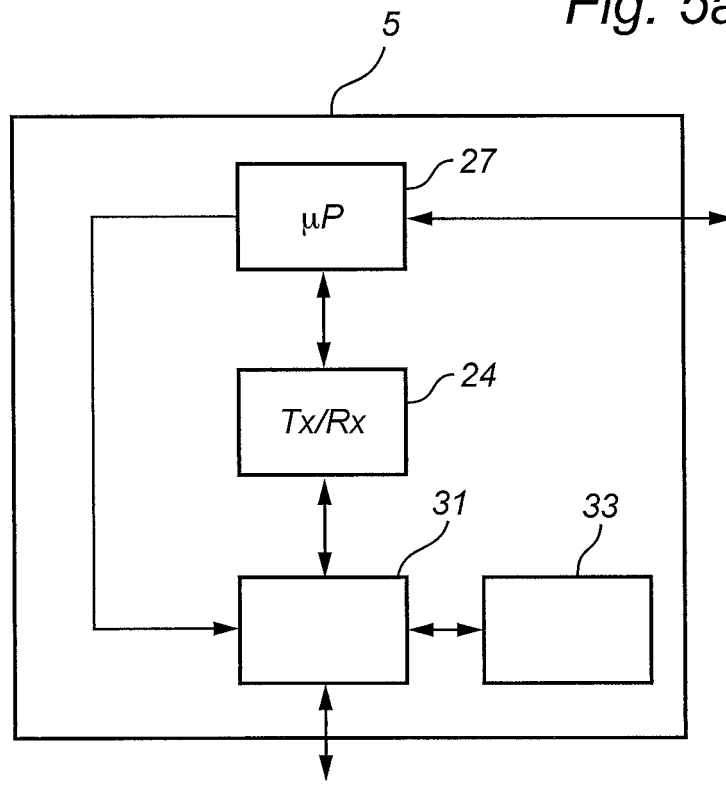

FIGS. 5a-b are schematic block diagrams of further example embodiments of the level gauge system according to the present invention.

Referring first to FIG. 5a, the measurement unit 5 of the level gauge system comprises a transceiver 24, a processing unit 27, a connector 30 and switching circuitry 31. As in the embodiment described above with reference to FIG. 3b, the processing unit 27 is connected to the transceiver 24 and connectable to an external device as indicated by the arrows in FIG. 5a. Furthermore, the switching circuitry 31 is provided between the transceiver 24 and the transmission line probe 6 (or other type of propagating device) and the switching circuitry 31 is connected to the processing unit 27 and can be controlled by the processing unit 27 to either connect the transceiver to the transmission line probe 6 or to the connector 30. Thereby, the measurement unit 5 can be connected, through the connector 30, to a verification station 12 without having to detach the measurement unit 5 from the tank 2.

As an alternative to the embodiment described above with reference to FIG. 5a, the level gauge system 1 may comprise a verification arrangement 33 instead of the connector 30, such that no external verification station 12 is required. This is schematically illustrated in FIG. 5b.

In addition to what has been described above, the reference reflector 9 may also be used to simplify installation of the GWR-system 1. Instead if using time-consuming and cumbersome manual measurements, such as through hand-dipping, the installation offset and/or the scale factor of the installation can be determined based on measurements using the GWR-system 1.

The installation offset can be determined based on the measured distance to the reference reflector 9, and the scale factor can be determined based on the measured distances to the reference reflector 9 and the end of the transmission line probe 6 when the tank 2 is empty.

The person skilled in the art realizes that the present invention by no means is limited to the preferred embodiments described above. On the contrary, many modifications and variations are possible within the scope of the appended claims.

What is claimed is:

1. A method of verifying a measurement accuracy of a level gauge system comprising a measurement unit and a propagation device attached to a tank for propagating electromagnetic signals generated by said measurement unit towards a product in the tank, wherein said method comprises the steps of:

feeding, to said propagation device, a first electromagnetic transmit signal generated by said measurement unit;

receiving, at said measurement unit, a first electromagnetic reflection signal being a reflection of said first electromagnetic transmit signal at a reference reflector arranged in said tank;

determining a first measurement value indicative of a time-of-flight of said first electromagnetic reflection signal from said measurement unit to said reference reflector and back to said measurement unit;

after having determined said first measurement value, feeding, to a verification arrangement having at least one known electromagnetic signal propagation property, an electromagnetic signal generated by said measurement unit;

receiving, at said measurement unit, a response signal from said verification arrangement, said response signal being indicative of said at least one electromagnetic signal propagation property of said verification arrangement;

determining a measurement unit verification measurement value of said at least one electromagnetic signal propagation property based on said response signal;

feeding, to said propagation device, a second electromagnetic transmit signal generated by said measurement unit;

receiving, at said measurement unit, a second electromagnetic reflection signal being a reflection of said second electromagnetic transmit signal at said reference reflector arranged in said tank;

determining a second measurement value indicative of a time-of-flight of said second electromagnetic reflection signal from said measurement unit to said reference reflector and back to said measurement unit; and determining a verification result based on a first difference between said first measurement value and said second measurement value, and on a second difference between said measurement unit verification measurement value and said at least one known electromagnetic signal propagation property;

wherein said verification result is positive if said first difference is smaller than a first predefined value and said second difference is smaller than a second predefined value.

2. The method according to claim 1, wherein:
said verification arrangement comprises a connector; and
said method further comprises the steps of:
disconnecting said measurement unit from said propagation device after having determined said first measurement value;
connecting said measurement unit to the connector of said verification arrangement; and
disconnecting said measurement unit from the connector of said verification arrangement and reconnecting said measurement unit to said propagation device after having determined said measurement unit verification measurement value.

3. The method according to claim 2, wherein:
said verification arrangement further comprises a verification waveguide electrically connected to said connector, said verification waveguide providing a known delay between an electromagnetic signal fed to said verification waveguide and a reflected electromagnetic signal returned by said verification waveguide.

4. The method according to claim 1, further comprising the steps of:
recording a first value of an internal temperature of the measurement unit in connection with said step of determining said first measurement value; and
recording a second value of said internal temperature of the measurement unit in connection with said step of determining said second measurement value.

5. The method according to claim 4, wherein said verification result is further based on said first value of said internal temperature of the measurement unit and said second value of said internal temperature of the measurement unit.

6. The method according to claim 1, wherein said level gauge system is a guided wave radar level gauge system, said propagation device is a transmission line probe, and said reference reflector is arranged along said transmission line probe.

7. The method according to claim 1, wherein said reference reflector is arranged at such a level in the tank that said reference reflector remains unsubmerged in said product during normal operation of said tank.

8. The method according to claim 1, wherein said response signal from the verification arrangement is indicative of a length of a verification waveguide comprised in said verification arrangement.

9. Non-volatile computer readable medium comprising code adapted to control a level gauge system to carry out the method according to claim 1.

10. A level gauge system, for determining a filling level of a product in a tank, said level gauge system comprising:
a transceiver configured to generate, transmit and receive electromagnetic signals;
a propagation device arranged to propagate an electromagnetic transmit signal from said transceiver towards said product and to return to said transceiver an electromagnetic reflection signal resulting from reflection of said electromagnetic transmit signal at a surface of said product; and
a reference reflector arranged in said tank for providing an electromagnetic reference signal resulting from reflection of said electromagnetic transmit signal at said reference reflector;
a memory; and
processing circuitry connected to said transceiver and said memory, said processing circuitry being controllable between:
a filling level determination mode, in which said processing circuitry determines said filling level based on said electromagnetic reflection signal; and
a verification mode, in which said processing circuitry:
determines if said memory contains an indication that verification measurement using a verification arrangement has been successfully carried out; and
if said memory contains said indication:
determines a measurement value indicative of a distance to said reference reflector based on said electromagnetic reference signal;
compares said measurement value with a previous measurement value determined prior to said verification measurement; and
provides a positive verification result if the comparison indicates that a difference between said measurement value and said previous measurement value is smaller than a predefined value.

* * * * *